US012136705B2

(12) United States Patent
Fan et al.

(10) Patent No.: US 12,136,705 B2
(45) Date of Patent: Nov. 5, 2024

(54) BATTERY CELL INCLUDING SURPLUS LITHIUM DISPOSED INSIDE CAVITY OF JELLY ROLL FOR PRE-LITHIATION, AND METHOD OF FORMING THE SAME

(71) Applicant: American Lithium Energy Corporation, Carlsbad, CA (US)

(72) Inventors: Jiang Fan, San Diego, CA (US); Christopher Kompella, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 0 days.

(21) Appl. No.: 16/656,277

(22) Filed: Oct. 17, 2019

(65) Prior Publication Data

US 2020/0127336 A1   Apr. 23, 2020

Related U.S. Application Data

(60) Provisional application No. 62/747,027, filed on Oct. 17, 2018.

(51) Int. Cl.
*H01M 10/0587* (2010.01)
*H01M 4/04* (2006.01)
(Continued)

(52) U.S. Cl.
CPC ..... *H01M 10/0587* (2013.01); *H01M 4/0459* (2013.01); *H01M 4/382* (2013.01);
(Continued)

(58) Field of Classification Search
CPC ......... H01M 10/0587; H01M 10/0525; H01M 4/0459; H01M 4/382
(Continued)

(56) References Cited

U.S. PATENT DOCUMENTS

2006/0093917 A1* 5/2006 Howard ................ H01M 4/382
429/231.95
2006/0093923 A1* 5/2006 Howard .............. H01M 4/5815
429/322

(Continued)

FOREIGN PATENT DOCUMENTS

| JP | 2011076853 A | * | 4/2011 | ............. H01G 9/016 |
| JP | 2011077279 A | * | 4/2011 | ............. H01G 11/06 |
| WO | WO-2018155468 A1 | * | 8/2018 | ............. H01G 11/06 |

OTHER PUBLICATIONS

"Couple." Lexico.com US Dictionary, Oxford University Press, https://www.lexico.com/en/definition/couple. Accessed Oct. 6, 2021. (Year: 2021).*

(Continued)

*Primary Examiner* — Sean P Cullen
(74) *Attorney, Agent, or Firm* — Jones Day

(57) ABSTRACT

A battery cell may be formed to include a surplus lithium. The surplus lithium may be disposed inside a cavity formed by winding a separator, a positive electrode, and a negative electrode to form a jelly roll of the battery cell. The surplus lithium may be discharged in order to pre-lithiate the battery cell. For example, the surplus lithium may be coupled with the positive electrode and discharged while the battery cell is at least partially charged. Alternatively, the surplus lithium may be coupled with the negative electrode and discharged while the battery cell is at least partially discharged. Moreover, the surplus lithium may be coupled with a negative current collector of the battery cell in order to prevent one or more chemical reactions triggered by an over discharge of the battery cell from corroding the negative current collector of the battery cell.

18 Claims, 14 Drawing Sheets

(51) Int. Cl.
    *H01M 4/38*      (2006.01)
    *H01M 10/0525*      (2010.01)
    *H01M 50/117*      (2021.01)
    *H01M 50/119*      (2021.01)
    *H01M 50/121*      (2021.01)
    *H01M 50/124*      (2021.01)

(52) U.S. Cl.
    CPC ..... *H01M 10/0525* (2013.01); *H01M 50/117* (2021.01); *H01M 50/119* (2021.01); *H01M 50/121* (2021.01); *H01M 50/124* (2021.01)

(58) Field of Classification Search
    USPC .......... 429/94, 231.95, 50; 29/623.3
    See application file for complete search history.

(56) References Cited

U.S. PATENT DOCUMENTS

| | | | | |
|---|---|---|---|---|
| 2009/0246626 | A1* | 10/2009 | Tasaki | H01M 4/134 429/208 |
| 2011/0256438 | A1* | 10/2011 | Taguchi | H01G 11/06 429/94 |
| 2012/0293914 | A1* | 11/2012 | Nansaka | H01M 50/557 429/163 |
| 2013/0201606 | A1* | 8/2013 | Nansaka | H01G 11/50 361/517 |
| 2015/0349346 | A1* | 12/2015 | Yushin | H01M 10/0587 429/231.95 |
| 2015/0380721 | A1* | 12/2015 | Lee | H01M 4/13 429/233 |
| 2017/0324255 | A1* | 11/2017 | Crompton | H01M 4/94 |
| 2020/0066459 | A1* | 2/2020 | Yokoshima | H01G 11/06 |

OTHER PUBLICATIONS

"Couple." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1236569. (Year: 2010).*

* cited by examiner

BATTERY CELL INCLUDING SURPLUS LITHIUM DISPOSED INSIDE CAVITY OF JELLY ROLL FOR PRE-LITHIATION, AND METHOD OF FORMING THE SAME

CROSS REFERENCE TO RELATED APPLICATION

This application claims priority to U.S. Provisional Application No. 62/747,027, entitled "MANUFACTURING BATTERY CELLS USING SACRIFICIAL ELECTRODES" and filed on Oct. 17, 2018, the disclosure of which is incorporated herein by reference in its entirety.

STATEMENT OF GOVERNMENT SUPPORT

This invention was made with Government support under contract FA9453-19-P-0559 awarded by the United States Air Force and Prime Contract W56KGU-18-C-0025, Subcontract GTS-S-18-267 awarded by the United States Army. The Government has certain rights in the invention.

TECHNICAL FIELD

The subject matter described herein relates generally to batteries and more specifically to the manufacturing of battery cells.

BACKGROUND

The high energy density and high current output of lithium ion battery cells means that lithium ion battery cells may be suitable for a variety of high energy and high power applications. However, a lithium ion battery cell may be susceptible to lithium loss arising from lithium consuming parasitic reactions that occur during the charging and discharging of the lithium ion battery cell such as, for example, the formation of a solid electrolyte interface (SEI) at the negative electrode. Lithium loss may cause the lithium ion battery cell to undergo irreversible capacity loss.

SUMMARY

Systems, methods, and articles of manufacture, including batteries and battery components, are provided. In some implementations of the current subject matter, there is provided a battery including: a jelly roll formed by winding a separator, a positive electrode, and a negative electrode; and a surplus lithium disposed inside a cavity formed by the winding the separator, the positive electrode, and the negative electrode, the surplus lithium being discharged in order to pre-lithiate the battery cell.

In some variations, one or more features disclosed herein including the following features can optionally be included in any feasible combination. The surplus lithium may be coupled with the positive electrode. The battery cell may be pre-lithiated by the discharge of the surplus lithium when the battery cell is at least partially charged.

In some variations, the surplus lithium may be coupled with the negative electrode. The battery cell may be pre-lithiated by the discharge of the surplus lithium when the battery cell is at least partially discharged.

In some variations, the surplus lithium may be further coupled to a negative current collector of the battery cell. The surplus lithium may prevent one or more chemical reactions triggered by an over discharge of the battery cell from corroding the negative current collector of the battery cell.

In some variations, the separator, the positive electrode, and the negative electrode may be wound around a mandrel to form the jelly roll. The cavity may formed by removing the mandrel from the jelly roll.

In some variations, the jelly roll may be formed by winding the separator, the positive electrode, and the negative electrode around the surplus lithium.

In some variations, the battery cell may be a prismatic battery cell or a cylindrical battery cell.

In some variations, the battery cell may include additional surplus lithium applied to an exterior surface of the jelly roll and/or an interior surface of a case of the battery cell. The protective layer may be a perforated metal, a polymer, and/or a ceramic.

In another aspect, there is provided a method. The method may include: forming a battery cell, the battery including a jelly roll formed by winding a separator, a positive electrode, and a negative electrode, the battery further including a surplus lithium inside a cavity formed by the winding the separator, the positive electrode, and the negative electrode; and pre-lithiating the battery cell including by discharging the surplus lithium.

In some variations, one or more features disclosed herein including the following features can optionally be included in any feasible combination. The surplus lithium may be coupled with the positive electrode. The battery cell may be pre-lithiated by the discharge of the surplus lithium when the battery cell is at least partially charged.

In some variations, the surplus lithium may be coupled with the negative electrode. The battery cell may be pre-lithiated by the discharge of the surplus lithium when the battery cell is at least partially discharged.

In some variations, the surplus lithium may be further coupled to a negative current collector of the battery cell. The surplus lithium may prevent one or more chemical reactions triggered by an over discharge of the battery cell from corroding the negative current collector of the battery cell.

In some variations, the separator, the positive electrode, and the negative electrode may be wound around a mandrel to form the jelly roll. The cavity may formed by removing the mandrel from the jelly roll.

In some variations, the jelly roll may be formed by winding the separator, the positive electrode, and the negative electrode around the surplus lithium.

In some variations, the battery cell may be a prismatic battery cell or a cylindrical battery cell.

In some variations, the battery cell may include additional surplus lithium applied to an exterior surface of the jelly roll and/or an interior surface of a case of the battery cell. The protective layer may be a perforated metal, a polymer, and/or a ceramic.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
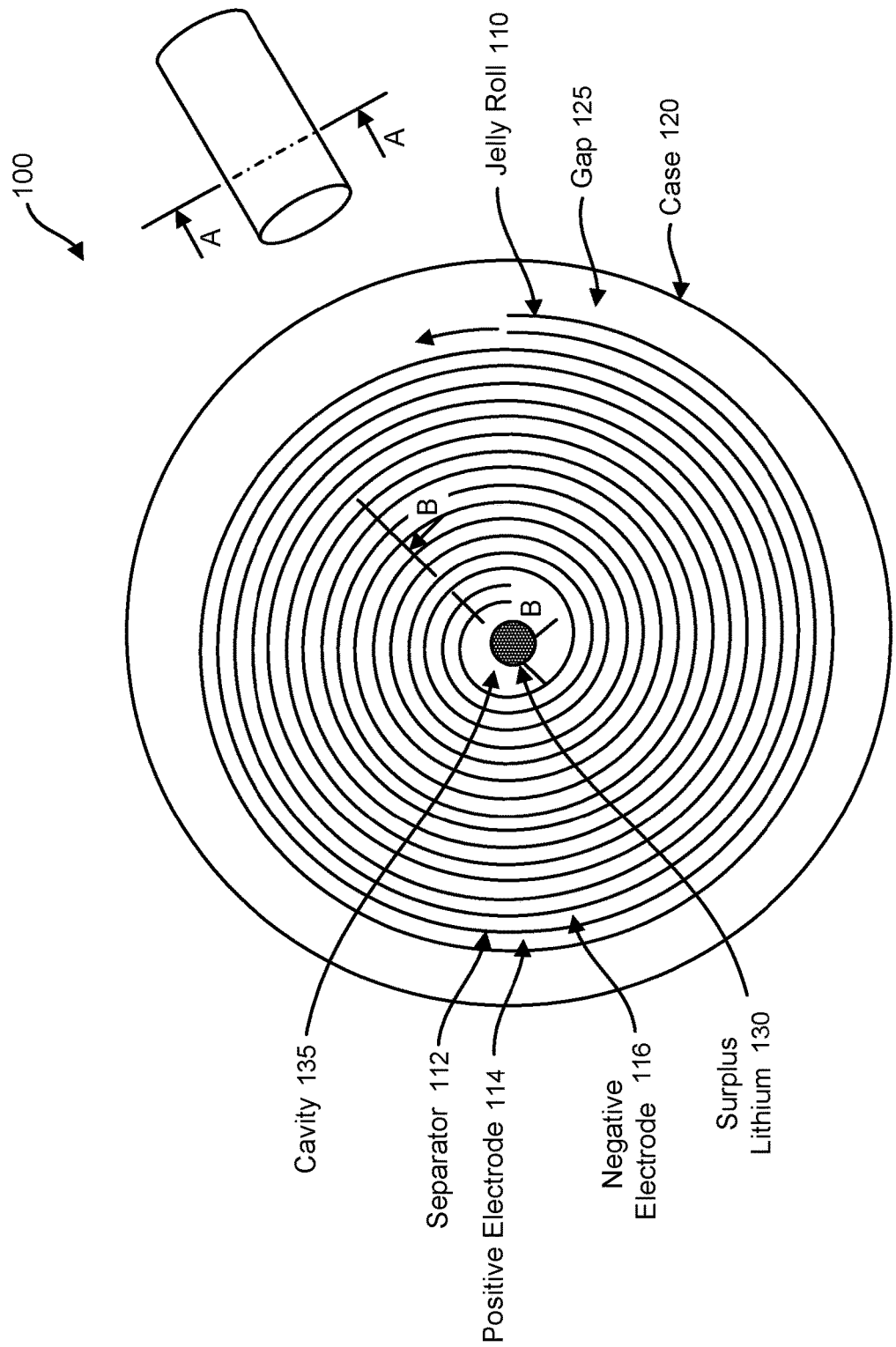
FIG. 1A depicts a horizontal cross sectional view of an example of a battery cell consistent with implementations of the current subject matter.

The negative electrode (e.g., graphite (C) anode, nano silicon (Si) anode, tin oxide ($SnO_2$) anode, and/or the like) of a lithium ion battery cell may be subject to pre-lithiation in order to counteract the irreversible capacity loss that occur due to the loss of lithium. However, conventional pre-lithiation techniques, such as applying a lithium powder to the surface of the negative electrode, may render the negative electrode highly reactive. Manufacturing a lithium ion battery cell with a volatile negative electrode may require an inert environment (e.g., dry room). Moreover, the volatility of a negative electrode that is pre-lithiated with lithium powder may also give rise to safety issues. As such, the cost of manufacturing lithium ion battery cells with conventionally pre-lithiated negative electrodes may be especially high while the quality of the resulting lithium ion battery cells may be less than optimal.

In some implementations of the current subject matter, surplus lithium may be incorporated into a lithium ion battery cell in order to compensate for lithium loss at the lithium ion battery cell. For example, the lithium ion battery cell may include a sacrificial electrode including the surplus lithium. The sacrificial electrode may be a bar of lithium metal disposed in a center of a cylindrical or flat jelly roll formed by winding the positive electrode, negative electrode, and separator of the lithium ion battery cell. The sacrificial electrode may be connected to the positive electrode of the lithium ion battery cell such that at least a portion of the surplus lithium discharged from the sacrificial electrode may be deposited in the positive electrode of the lithium ion battery cell. Alternatively, the sacrificial electrode may be connected to the negative electrode of the lithium ion battery cell such that at least a portion of the surplus lithium discharged from the sacrificial electrode may be deposited in the negative electrode of the lithium ion battery cell. Paramount in this implementation is the use of porous current collectors, such as expanded metal foils, perforated foils, and composite carbon-based foils (i.e. carbon fiber, graphene, etc.) or similar to form the positive and negative electrodes. This facilitates the diffusion of lithium from the source between the layers of the electrodes, rather than forcing the lithium to diffuse along the length of the electrode. This can reduce the diffusion length by several orders of magnitude. In doing so, the lithium ion battery cell may be pre-lithiated to compensate for lithium lost during the charging and/or discharging of the lithium-ion battery cell.

In some implementations of the current subject matter, the lithium ion battery cell may further include surplus lithium in order to preserve the lithium ion battery cell when the lithium ion battery cell is subject to over discharge. Without over discharge protection, over discharging the lithium ion battery cell may change the morphology of one or more components of the lithium ion battery cell and thus degrade the capacity of the lithium ion battery cell. Furthermore, over discharging the lithium ion battery cell may trigger an anodic corrosion of the negative current collector in the lithium ion battery cell. The anodic corrosion may also cause metal ions from the negative current collector to dissolve into the electrolyte in the lithium ion battery cell. An internal short circuit may eventually develop within the lithium ion battery cell as the metal ions from the negative current collector travel through the separator and accumulate on the positive electrode in the lithium ion battery cell. By contrast, the surplus lithium included in the lithium ion battery cell may prevent the anodic corrosion of the negative current collector because the anodic corrosion triggered by the over discharging of the lithium ion battery cell may act on the surplus lithium first before the negative current collector. As such, the surplus lithium may protect the lithium ion battery cell from the consequences of being over discharged.

Figure 1B:
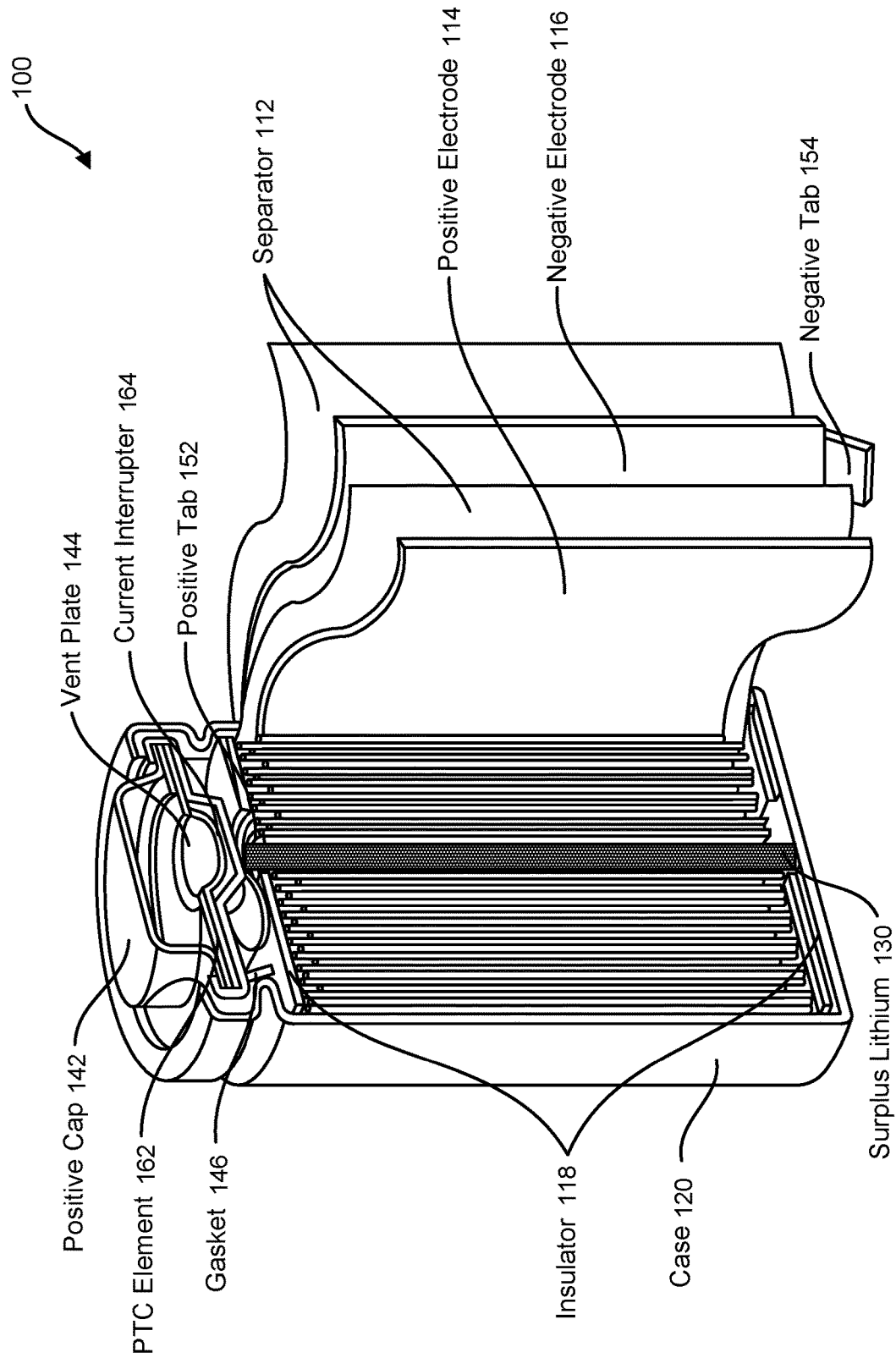
FIG. 1B depicts a vertical cross sectional view of an example of a battery cell consistent with implementations of the current subject matter.

FIGS. 1A-B depict an example of a battery cell 100 consistent with implementations of the current subject matter. Referring to FIGS. 1A-B, the battery cell 100 may include a jelly roll 110 disposed inside a case 120. In the example shown in FIGS. 1A-B, the battery cell 100 may be a cylindrical battery cell. As such, the jelly roll 110 may be substantially cylindrical in shape. The jelly roll 110 may be formed by winding multiple layers of material, each of which corresponding to a component of the battery cell 100. For example, as shown in FIGS. 1A-B, the jelly roll 110 may include a separator 112 interposed between a positive electrode 114 and a negative electrode 116.

The surfaces of the jelly roll 110 may not directly contact the interior side wall of the case 120 because inadvertent contact between the case 120, which is typically metallic, the positive electrode 114, and the negative electrode 116 may form an internal short circuit within the battery cell 100. Instead, FIG. 1A shows a gap 125 between the exterior side surface of the jelly roll 110 and the interior side wall of the case 120. Moreover, an insulator 118 may be disposed between the jelly roll 110 and the case 120 to prevent inadvertent contact between the jelly roll 110 and the case 120.

In some implementations of the current subject matter, the battery cell 100 may include a surplus lithium 130, which may be disposed in a cavity 135 at a center of the jelly roll 110. The cavity 135 may be formed when the separator 112, positive electrode 114, and the negative electrode 116 are wound to form the jelly roll 110. For example, the cavity 135 may be formed by winding the separator 112, positive electrode 114, and the negative electrode 116 around a mandrel. The mandrel may be removed from the center of the jelly roll 110 before the surplus lithium 130 is inserted into the cavity 135 formed by the removal of the mandrel. Alternatively, the separator 112, positive electrode 114, and the negative electrode 116 may be wound around the surplus lithium 130 such that the surplus lithium 130 is disposed inside the cavity 135 as a result of winding the separator 112, positive electrode 114, and the negative electrode 116 to form the jelly roll 110.

As shown in FIG. 1B, the surplus lithium 130 may be placed in direct contact with the case 120, which serves to transport lithium to the positive electrode 114 and/or the negative electrode 116. However, it should be appreciated the surplus lithium 130 cannot be placed in direct contact with the positive electrode 114 and/or the negative electrode 116 included in the jelly roll 110. Accordingly, in some implementations of the current subject matter, the separator 112 can provide insulation that prevents the surplus lithium 130 from contacting the positive electrode 114 and/or the negative electrode 116 included in the jelly roll 110. Alternatively and/or additionally, a protective layer (e.g., a polymer film, a ceramic coating, and/or the like) may also be disposed around the exterior surface of the surplus lithium 130 and/or the interior surface of the cavity 135 in order to prevent the surplus lithium 130 from contacting the positive electrode 114 and/or the negative electrode 116 included in the jelly roll 110.

It should be appreciated that the battery cell 100 may include additional surplus lithium. For example, in addition to the surplus lithium 130 disposed in the center of the jelly roll 110, the battery cell 100 may include a sheet of surplus lithium applied to an exterior surface of the jelly roll 110 and/or an interior surface of the case 120. In instances where the case 120 is neutral, as in some prismatic cells and large-format cylindrical cells, this configuration can yield a three-electrode cell that allows a user to control the quantity of the surplus lithium 130 discharged as well as the time when the surplus lithium 130 is discharged.

In some implementations of the current subject matter, the surplus lithium 130 may serve as a sacrificial electrode that is at least partially oxidized in order to pre-lithiate the battery cell 100. Pre-lithiating the battery cell 100 may compensate for lithium lost to lithium consuming parasitic reactions that occur during the charging and discharging of the battery cell 100. For example, the surplus lithium 130 may be connected to the positive electrode 114. As such, at least a portion of the lithium from the surplus lithium 130 may be discharged and deposited at the positive electrode 114, for example, while the battery cell 100 is at least partially charged and there is a deficit of lithium ions at the positive electrode 114. The battery cell 100 may be discharged after the battery cell 100 is pre-lithiated by depositing lithium at the positive electrode 114.

Alternatively, the surplus lithium 130 may be connected to the negative electrode 116 of the battery cell 100, in which case at least a portion of lithium from the surplus lithium 130 may be discharged and deposited at the negative electrode 116 to pre-lithiate the battery cell 100. Lithium may be deposited at the negative electrode 116 while the battery cell 100 is at least partially discharged and there is a deficit of lithium ions at the negative electrode 116. The battery cell 100 may be charged after the battery cell 100 is pre-lithiated with the deposit of lithium at the negative electrode 116.

In some implementations of the current subject matter, the surplus lithium 130 may be connected to the positive electrode 114 (or the negative electrode 116) indirectly through the case 120 of the battery cell 100. Alternatively, the surplus lithium 130 may be connected to the positive electrode 114 (or the negative electrode 116) by being welded directly to the positive electrode 114 (or the negative electrode 116). The surplus lithium 130, which is soft and malleable, can be compressed to form a direct contact between the surplus lithium 130 and the positive electrode 114 (or the negative electrode 116). The connection between the surplus lithium 130 and the positive electrode 214 (or the negative electrode 216) may be internal or external to the battery cell 200. An external connection may be preferred in applications requiring greater control over the degree of lithiation so as to prevent overlithiation of the positive electrode 214 (or the negative electrode 116).

In some implementations of the current subject matter, the battery cell 100 may further include the surplus lithium 130 in order to preserve the battery cell 100 when the battery cell 100 is subject to over discharge. Without over discharge protection, over discharging the battery cell 100 may trigger adverse chemical reactions capable of changing the morphology of one or more components of the battery cell 100 including, for example, over-deintercalation of lithium at the negative electrode 116, decomposition of the solid electrolyte interface, solid-state amorphization of the positive electrode 114, and/or the like. Changing the morphology of the components of the battery cell 100 may permanently degrade the capacity of the battery cell 100. Over discharging the battery cell 100 may also trigger adverse chemical reactions capable of developing an internal short circuit within the battery cell 100. For example, over discharging the battery cell 100 may trigger an anodic corrosion of the negative current collector (e.g., the copper (Cu) current collector coupled with the negative electrode 116) in the battery cell 100 that causes metal ions (e.g., copper (Cu) ions) from the negative current collector to dissolve into the electrolyte in the battery cell 100. An internal short circuit may eventually develop within the battery cell 100 as the metal ions (e.g., copper (Cu) ions) from the negative current collector travel through the separator 112 and accumulate on the positive electrode 114.

By contrast, the surplus lithium 130 included in the battery cell 100 may mitigate the effects of the adverse chemical reactions triggered by the over discharging of the battery cell 100. For example, including the surplus lithium 130 in the battery cell 200 may prevent one or more components of the battery cell 200 from undergoing morphology changes caused by the over discharging of the battery cell 200 because the adverse chemical reactions triggered by the over discharging of the battery cell 200 act on the surplus lithium 130 instead of the components of the battery cell 200. As such, the surplus lithium 130 may protect the battery cell 100 from the consequences of being over discharged.

It should be appreciated that the surplus lithium 130 may physically contact the negative current collector in order to protect the battery cell 100 from the consequences of over discharging. For example, the surplus lithium 130 may be disposed on a surface of the negative current collector. By further connecting the surplus lithium 130 in physical contact with the negative current collector with either the positive electrode 114 or the negative electrode 116, the surplus lithium 130 may serve to pre-lithiate the battery cell 100 as well as provide over discharge protection for the battery cell 100.

Referring to FIG. 1B, the battery cell 100 may further include a positive cap 142 on one end of the battery cell 100 and a negative cap on an opposite end of the battery cell 100. The positive electrode 114 may include a positive tab 152 configured to couple, via the positive cap 142, the positive electrode 114 to an external circuit. Furthermore, the negative electrode 116 may include a negative tab 154 configured to couple, via the negative cap, the negative electrode 116 to the external circuit.

In some implementations of the current subject matter, the battery cell 100 may include a primer layer that is permeable to lithium ion diffusion. For instance, the primer layer may include a polymer capable of absorbing electrolyte in order to provide ionic conductivity for faster diffusion (e.g., of lithium ions). This primer layer may further facilitate the manufacturing of the battery cell 100, particularly where the battery cell 100 includes porous current collectors. For example, during the coating process in which slurries forming the positive electrode 114 and/or the negative electrode 116 are coated onto the corresponding current collectors, the primer layer may block the pores present in the current collectors and thus prevent the slurries from leaking through the pores during the coating process. The primer layer may also contain one or more protective components or materials configured to respond to excessive voltage, pressure, and/or temperature at the battery cell 100.

As shown in FIG. 1B, the battery cell 100 may further include a vent plate 144 and a gasket 146 configured to relieve excess pressure buildup within the battery cell 100 by releasing gases that may otherwise cause the battery cell 100 to explode. The battery cell 100 may also include a positive temperature coefficient (PTC) element 162 whose conductivity is inversely proportional to the temperature of the battery cell 100. For example, the positive temperature coefficient element 162 may include one or more positive temperature coefficient material such as, for example, polyethylene (PE) and carbon black, polyvinylidene fluoride (PVDF) and carbon black, an inorganic conductive ceramic (e.g., barium titanium oxide ($BaTiO_2$) and/or the like) and polyethylene (PE).

Because the conductivity of the positive temperature coefficient element 162 decreases when the battery cell 100 is subject to rising temperatures, the positive temperature coefficient element 162 may serve to reduce current flow within the battery cell 100 when the battery cell 100 is subject to rising temperatures. Once the temperature of the battery cell 100 normalizes, the positive temperature coefficient element 162 may return to high conductivity. Alternatively and/or additionally, the battery cell 100 may include a current interrupter 164, which may be a fuse capable of permanently disrupt the flow of current within the battery cell 100 when the battery cell 100 is subject to excessive current, pressure, and/or voltage.

In the foregoing example, the battery cell 100 may be a lithium ion battery cell and the surplus lithium 130 may be incorporated into the battery cell 100 in order to compensate for lithium lost during the charging and discharging of the battery cell 100. However, it should be appreciated that the battery cell 100 may be any type of metal ion battery with surplus metal to compensate for metal loss. For example, the battery cell 100 may be a sodium (Na) ion battery cell having surplus sodium to compensate for the sodium that is lost during the charging and discharging of the battery cell 100.

Figure 2A:
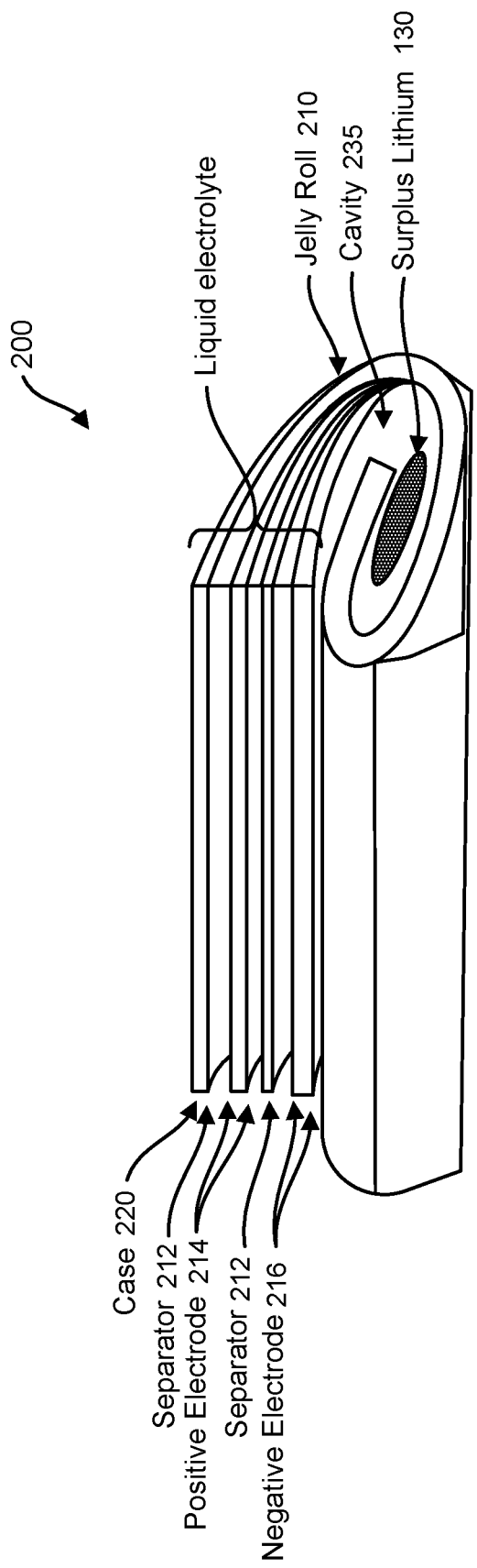
FIG. 2A depicts a horizontal cross sectional view of an example of a battery cell consistent with implementations of the current subject matter.
Figure 2B:
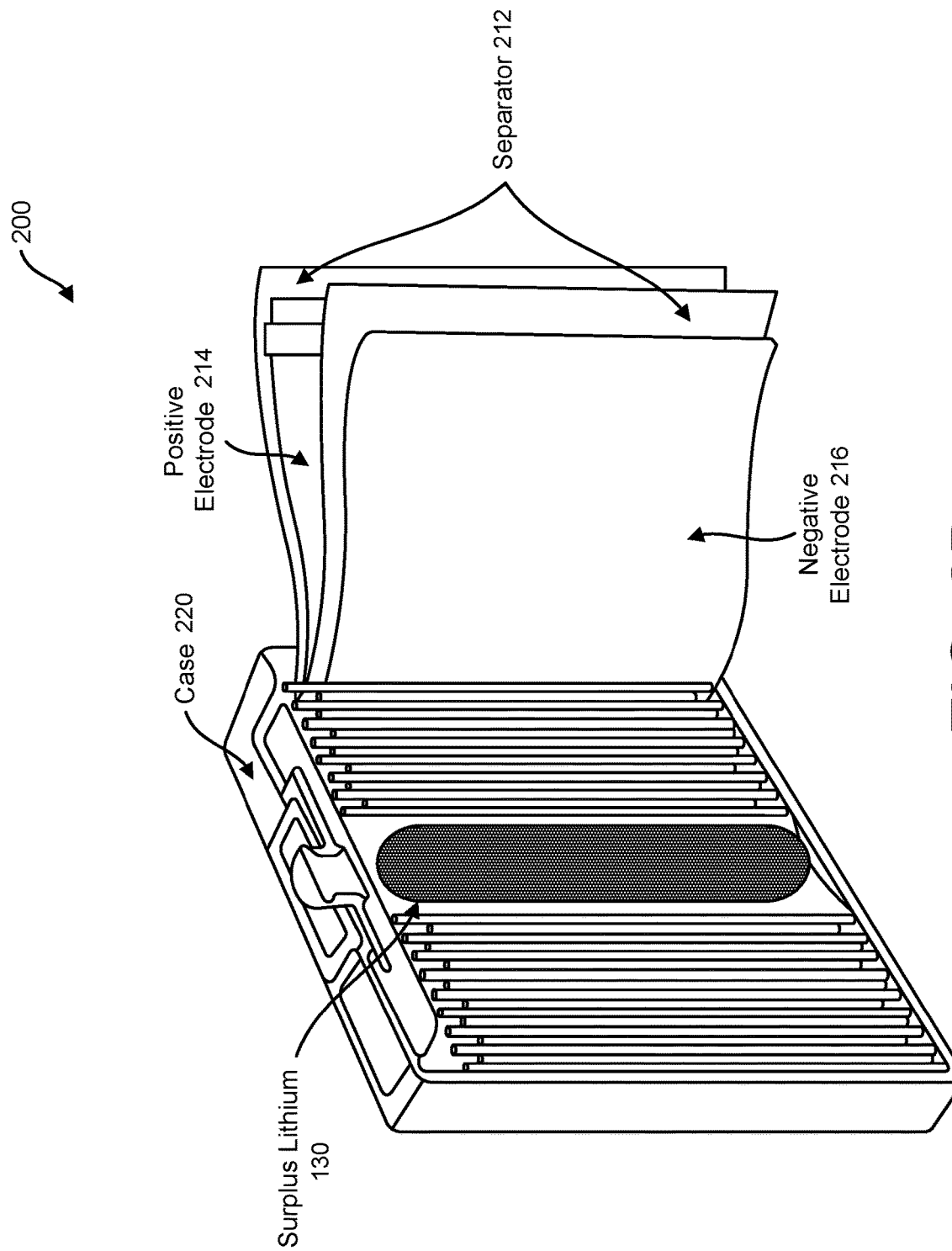
FIG. 2B depicts a vertical cross sectional view of an example of a battery cell consistent with implementations of the current subject matter.

FIGS. 2A-B depict an example of a battery cell 200 consistent with implementations of the current subject matter. Referring to FIGS. 2A-B, the battery cell 200 may include a jelly roll 210 disposed inside a case 220. In the example shown in FIGS. 2A-B, the battery cell 200 may be a prismatic battery cell. As such, the jelly roll 210 may be a flattened jelly roll that is substantially an elliptic cylinder in shape. The jelly roll 210 may be formed by winding multiple layers of material, each of which corresponding to a component of the battery cell 200. For example, as shown in FIGS. 2A-B, the jelly roll 210 may include a separator 212 interposed between a positive electrode 214 and a negative electrode 216.

In some implementations of the current subject matter, the battery cell 200 may also include the surplus lithium 130, which may be disposed in a cavity 235 at a center of the jelly roll 210. The cavity 235 may be formed when the separator 212, positive electrode 214, and the negative electrode 216 are wound to form the jelly roll 210. For example, the cavity 235 may be formed by winding the separator 212, positive electrode 214, and the negative electrode 216 around a mandrel. The mandrel may be removed from the center of the jelly roll 210 before the surplus lithium 130 is inserted into the cavity 235 formed by the removal of the mandrel. Alternatively, the separator 212, the positive electrode 214, and the negative electrode 216 may be wound around the surplus lithium 130 such that the surplus lithium 130 is disposed inside the cavity 235 as a result of winding the separator 212, positive electrode 214, and the negative electrode 216 to form the jelly roll 210.

It should be appreciated that the battery cell 200 may include additional surplus lithium. For example, in addition to the surplus lithium 130 disposed in the center of the jelly roll 210, the battery cell 200 may include a sheet of surplus lithium applied to an exterior surface of the jelly roll 210 and/or an interior surface of the case 220.

In some implementations of the current subject matter, the surplus lithium 130 may serve as a sacrificial electrode that is at least partially oxidized in order to pre-lithiate the battery cell 200. Pre-lithiating the battery cell 200 may compensate for lithium lost to lithium consuming parasitic reactions that occur during the charging and discharging of the battery cell 200. For example, the surplus lithium 130 may be connected to the positive electrode 214, in which case at least a portion of the lithium from the surplus lithium 130 may be discharged and deposited at the positive electrode 214 while the battery cell 200 is at least partially charged and there is a deficit of lithium ions at the positive electrode 214. The battery cell 200 may be discharged after the battery cell 200 is pre-lithiated by depositing lithium at the positive electrode 214.

Alternatively, the surplus lithium 130 may be connected to the negative electrode 216 of the battery cell 20. As such, at least a portion of lithium from the surplus lithium 130 may be discharged and deposited at the negative electrode 216 to pre-lithiate the battery cell 200. Moreover, lithium may be deposited at the negative electrode 216 while the battery cell 200 is at least partially discharged and there is a deficit of lithium ions at the negative electrode 216. The battery cell 200 may be charged after the battery cell 200 is pre-lithiated with the deposit of lithium at the negative electrode 216.

In some implementations of the current subject matter, the battery cell 200 may further include the surplus lithium 130 in order to preserve the battery cell 200 when the battery cell 200 is subject to over discharge. For example, including the surplus lithium 130 in the battery cell 200 may prevent one or more components of the battery cell 200 from undergoing morphology changes caused by the over discharging of the battery cell 200 because the adverse chemical reactions triggered by the over discharging of the battery cell 200 act on the surplus lithium 130 instead of the components of the battery cell 200. As such, the surplus lithium 130 may protect the battery cell 200 from various consequences of being over discharged including, for example, capacity degradation, internal short circuit, and/or the like.

In some implementations of the current subject matter, the surplus lithium 130 may physically contact the negative current collector in order to protect the battery cell 200 from the consequences of over discharging. For example, the surplus lithium 130 may be disposed on a surface of the negative current collector. The surplus lithium 130 may be further connected to either the positive electrode 114 or the negative electrode 116 such that the surplus lithium 130 may serve to pre-lithiate the battery cell 200 as well as provide over discharge protection for the battery cell 200.

In some implementations of the current subject matter, the surplus lithium 130 may be connected to the positive electrode 214 (or the negative electrode 216) indirectly through the case 220 of the battery cell 200. Alternatively, the surplus lithium 130 may be connected to the positive electrode 214 (or the negative electrode 216) by being welded directly to the positive electrode 214 (or the negative electrode 216). The surplus lithium 130, which is soft and malleable, can be compressed to form a direct contact between the surplus lithium 130 and the positive electrode 214 (or the negative electrode 216). It should be appreciated that the connection between the surplus lithium 130 and the positive electrode 214 (or the negative electrode 216) may be internal or external to the battery cell 200. An external connection may be preferred in applications requiring greater control over the degree of lithiation so as to prevent overlithiation of the positive electrode 214.

Although not shown in FIGS. 2A-B, the battery cell 200 may also include one or more protective mechanisms for responding to excessive voltage, pressure, and/or temperature at the battery cell 100. For example, the battery cell 100 may include a primer layer as well as a vent plate and a gasket configured to relieve excess pressure buildup within the battery cell 200 including by releasing gases that may otherwise cause the battery cell 200 to explode.

The battery cell 200 may also include a positive temperature coefficient (PTC) element 262 whose conductivity is inversely proportional to the temperature of the battery cell 200. Because the conductivity of the positive temperature coefficient element decreases when the battery cell 200 is subject to rising temperatures, the positive temperature coefficient element may serve to reduce current flow within the battery cell 200 when the battery cell 200 is subject to rising temperatures. The positive temperature coefficient element 162 may return to high conductivity when the temperature of the battery cell 200 normalizes. Alternatively and/or additionally, the battery cell 100 may include a current interrupter, which may be a fuse capable of permanently disrupt the flow of current within the battery cell 200 when the battery cell 200 is subject to excessive current, pressure, and/or voltage.

In the example shown in FIGS. 2A-B, the battery cell 200 may be a lithium ion battery cell and the surplus lithium 130 may be incorporated into the battery cell 200 in order to compensate for lithium lost during the charging and discharging of the battery cell 200. However, it should be appreciated that the battery cell 200 may be any type of metal ion battery having surplus metal to compensate for metal loss. For example, the battery cell 200 may be a sodium (Na) ion battery cell having surplus sodium to compensate for the sodium that is lost during the charging and discharging of the battery cell 200.

Figure 3:
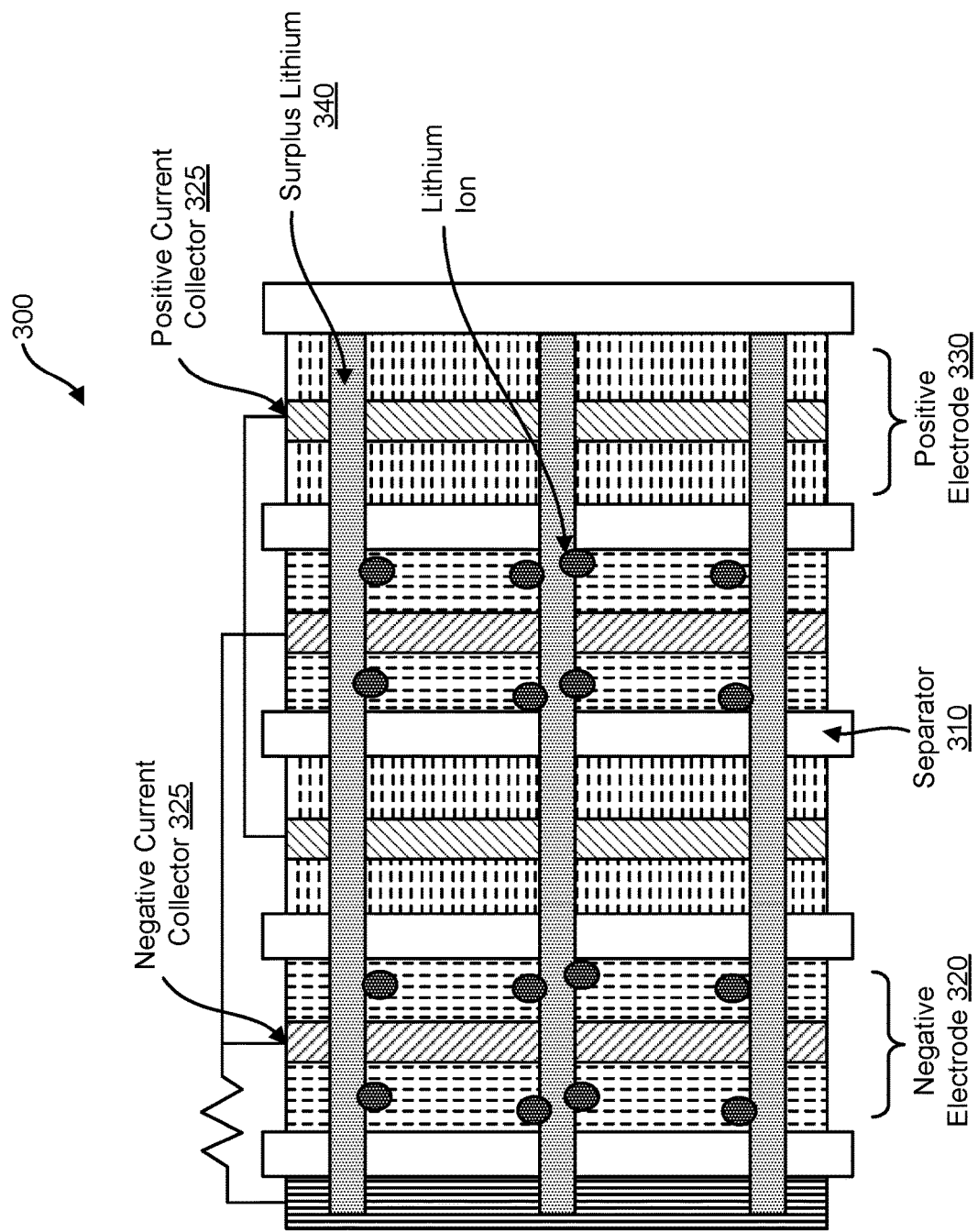
FIG. 3 depicts a cross sectional view of an example of a battery cell consistent with implementations of the current subject matter.

FIG. 3 depicts a cross sectional view of an example of a battery cell 300 consistent with implementations of the current subject matter. Referring to FIG. 3, the battery cell 300 may be a stacked cell (e.g., a z-fold stacked cell and/or the like) in which alternating layers of a separator 310 are interposed between layers of a negative electrode 320 and a positive electrode 330. As shown in FIG. 3, each layer of the negative electrode 320 may include a negative current collector 325 interposed between two layers of a negative electrode material (e.g., carbon and/or the like). Likewise, FIG. 3 shows each layer of the positive electrode 330 as having a positive current collector 335 interposed between two layers of a positive electrode material (e.g., a metal oxide such as a lithium oxide and/or the like).

Referring again to FIG. 3, the battery cell 300 may include a surplus lithium 340. For example, as shown in FIG. 3, the surplus lithium 340 may be included in the battery cell 300 as one or more rods of lithium. In some implementations of the current subject matter, the surplus lithium 340 may be disposed inside cavities formed by adjoining apertures included in each layer of the separator 310, the negative electrode 320, and the positive electrode 330. To prevent the surplus lithium 340 from contacting the negative electrode 320 and/or the positive electrode 330, the size of the apertures included in the separator 310 may be smaller than the size of the apertures included in each layer of the negative electrode 320 and the positive electrode 330.

In some implementations of the current subject matter, the surplus lithium 340 may be connected to the positive electrode 330 (or the negative electrode 320) indirectly through a case of the battery cell 300. Alternatively, the surplus lithium 340 may be connected to the positive electrode 330 (or the negative electrode 320) by being welded directly to the positive electrode 330 (or the negative electrode 320). The surplus lithium 340, which is soft and malleable, can be compressed to form a direct contact between the surplus lithium 340 and the positive electrode 330 (or the negative electrode 320). The connection between the surplus lithium 340 and the positive electrode 330 (or the negative electrode 320) may be internal or external to the battery cell 200. However, an external connection may be preferred in applications requiring greater control over the degree of lithiation so as to prevent overlithiation of the positive electrode 330.

Figure 4:
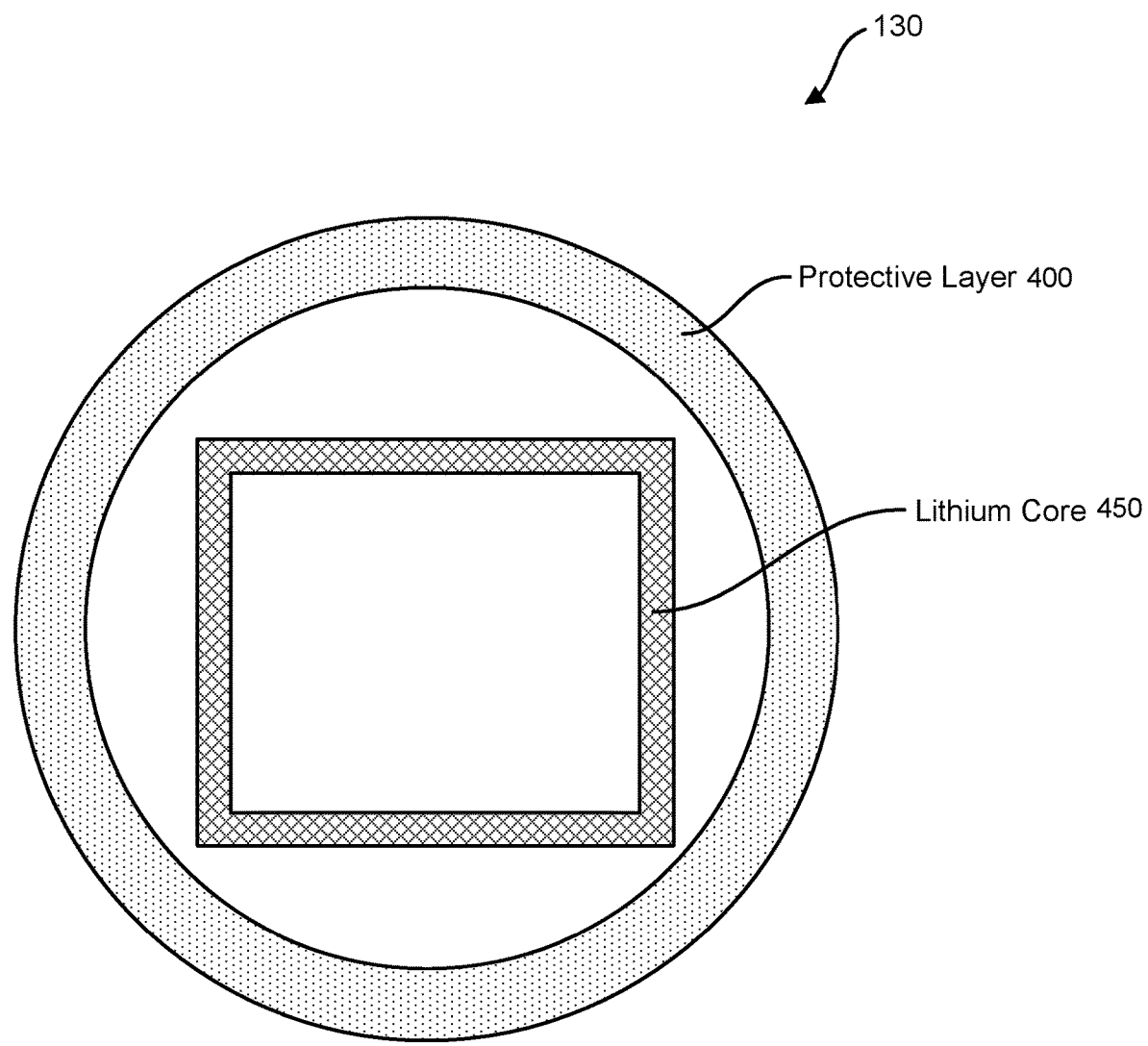
FIG. 4 depicts a horizontal cross sectional view of an example of surplus lithium consistent with implementations of the current subject matter.

FIG. 4 depicts a horizontal cross sectional view of an example of the surplus lithium 130 consistent with implementations of the current subject matter. As shown in FIG. 4, in some implementations of the current subject matter, the surplus lithium 130 may include a protective layer 400 and a core 450. The protective layer 400, which may cover at least a portion of an exterior surface of the core 450, may be configured to prevent unwanted contact between the core 450 and one or more components of a battery cell (e.g., the battery cell 100, the battery cell 200, the battery cell 300, and/or the like). Moreover, the protective layer 400 may be configured to prevent the lithium included in the core 450 from oxidizing prematurely, for example, during assembly of the battery cell 100 or the battery cell 200. It should be appreciated that the protective layer 400 and the lithium core 450 may have a different shape cross section than shown. Moreover, the lithium core 450 may be solid, instead of being hollow as in the example shown in FIG. 4.

In some implementations of the current subject matter, the protective layer 400 may be formed from a perforated metal (which shortens the diffusion path of the lithium ions from the lithium core 450), a polymer, a ceramic or amorphous solid electrolyte. Examples of ceramic or amorphous solid electrolytes include aluminum oxide ($Al_2O_3$), Fluoride-Doped Cubic $Li_7La_3Zr_2O_{12}$ (LLZO), $Li_{0.5}La_{0.5}TiO_3$ (LLTO), lithium phosphorous oxy-nitride (LiPON), $Li_{1.5}Al_{0.5}Ge_{1.5}P_3O_{12}$ (LAGP), Lithium Aluminum Titanium Phosphate (LATP), and lithium super ionic conductor (LiSICON). Examples of polymers forming the protective layer 400 may include polyurethane, silicone, polyphosphazenes, styrene butadiene rubber (SBR)-based binders, polyvinylidene fluoride (PVDF)-based binders, carboxymethyl cellulose (CMC)-based binders, poly(acrylic acid) (PAA)-based binders, polyvinyl acids (PVA)-based binders, poly (vinylpyrrolidone) (PVP)-based binders, and/or the like.

Figure 5:
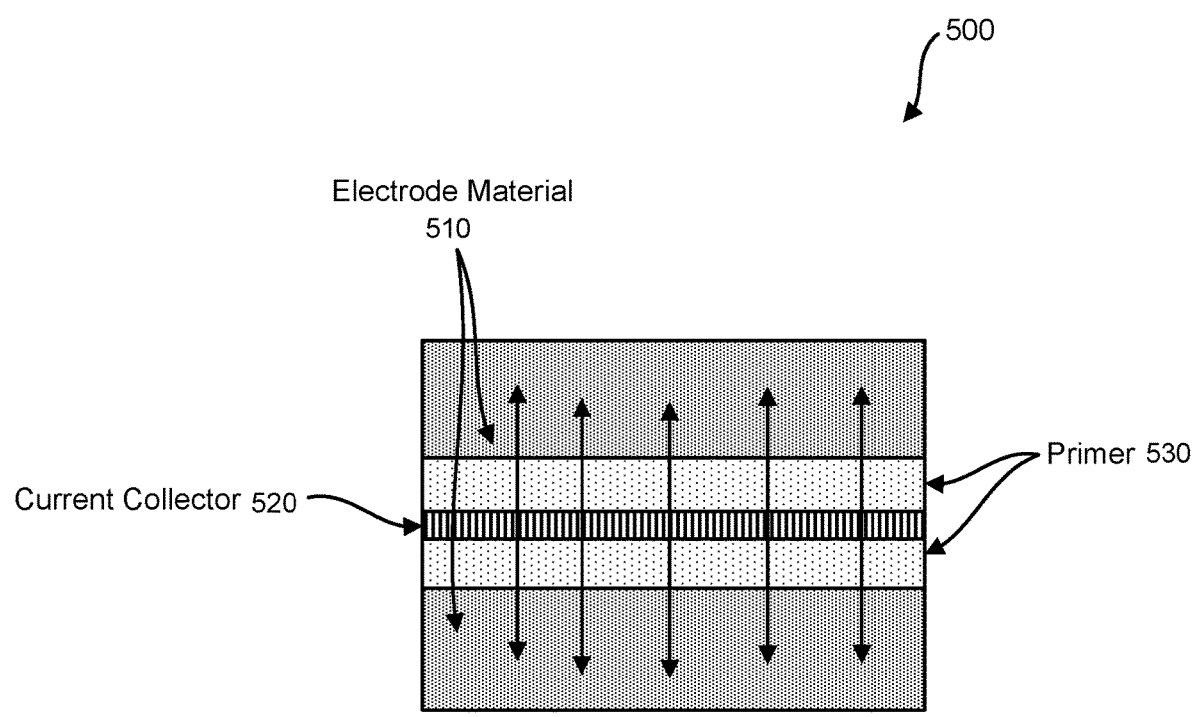
FIG. 5 depicts a cross sectional view of an example of an electrode with a porous current collector consistent with implementations of the current subject matter.

FIG. 5 depicts a cross sectional view of an example of an electrode 500 with a porous current collector consistent with implementations of the current subject matter. As shown in FIG. 5, the electrode 500 may include a current collector 520 disposed between two layers of an electrode material 510. The electrode 500 may implement a positive electrode such as, for example, the positive electrode 114 of the battery cell 100 shown in FIGS. 1A-B, the positive electrode 214 of the battery cell 200 shown in FIGS. 2A-B, or the positive electrode 330 of the battery cell 300 shown in FIG. 3.

Figure 6A:
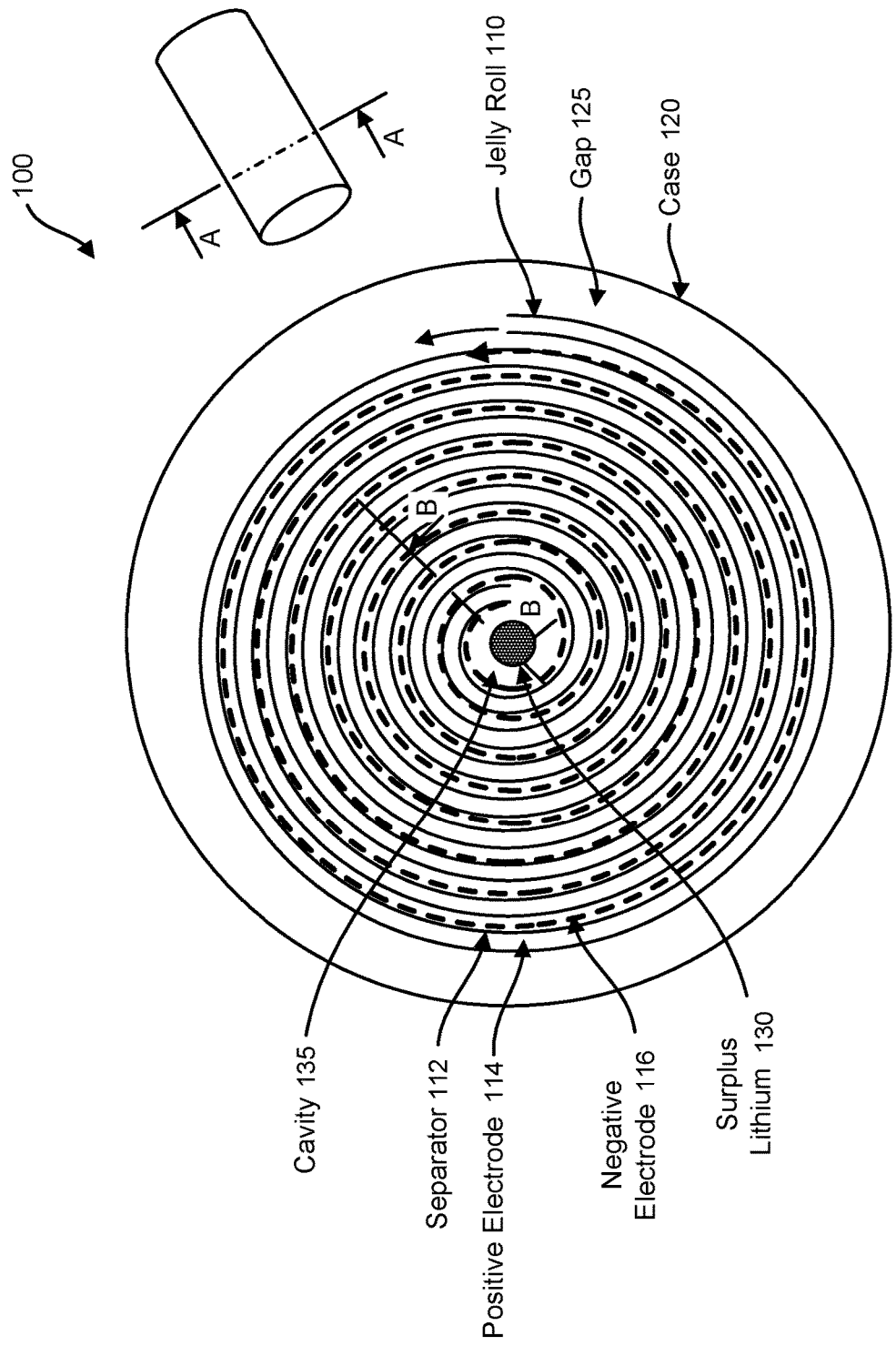
FIG. 6A depicts a cross sectional view of a battery cell illustrating an example of a diffusion pathway consistent with implementations of the current subject matter.
Figure 6B:
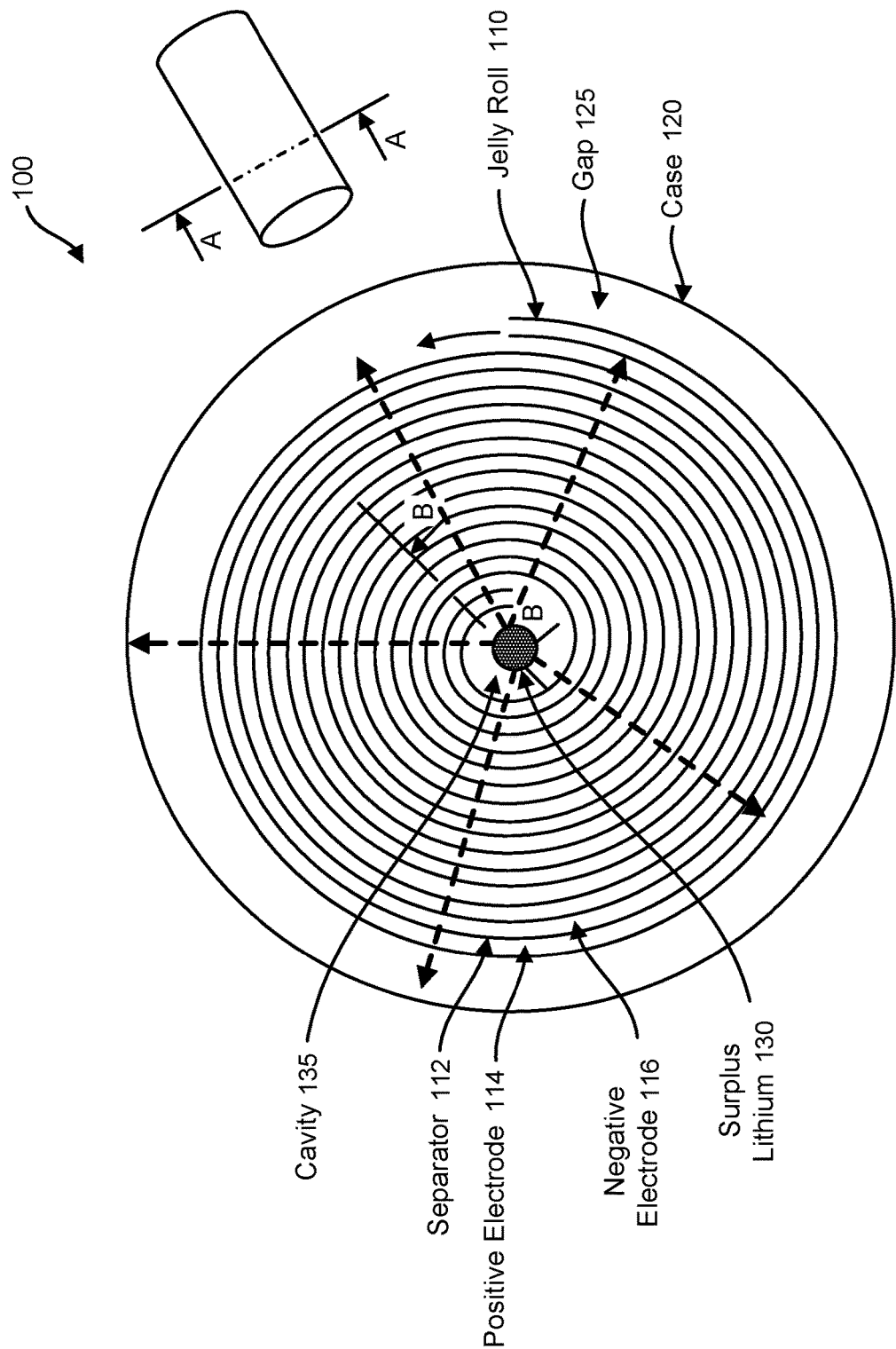
FIG. 6B depicts a cross sectional view of a battery cell illustrating another example of a diffusion pathway consistent with implementations of the current subject matter.

In some implementations of the current subject matter, the current collector 520 may be a porous current collector. That is, the current collector 520 may be a metallic foil (e.g., a copper (Cu) foil, an aluminum (Al) foil, and/or the like) having a plurality of pores, which shorten a diffusion pathway of lithium ions by at least providing a passageway through the current collector 520. To further illustrate, FIGS. 6A-B depict a cross sectional view of the battery cell 100 illustrating different examples of a diffusion pathway consistent with implementations of the current subject matter. FIG. 6A depicts the diffusion pathway (shown as a dashed line) of lithium ions (or another metal ion) in a variation of the battery cell 100 formed to include a non-porous current collector. Contrastingly, FIG. 6B depicts the diffusion pathway (shown as dashed lines) of lithium ions (or another metal ion) in another variation of the battery cell 100 formed to include a porous current collector such as, for example, the current collector 520.

Referring to FIGS. 6A-B, the inclusion of a porous current collector may shorten the diffusion pathway of lithium ions. For instance, while a non-porous current collector may force lithium ions to travel along each spiral of the jelly roll 110, a porous current collector may allow lithium ions to penetrate through the layers of the jelly roll 110. In doing so, the porous current collector may prevent the formation of a lithium gradient in which a disproportionately high concentration of lithium ions aggregates towards a center of the jelly roll 110. Instead, with a porous current collector, lithium ions from the surplus lithium 130 may radiate outward evenly from a center of the jelly roll 110.

Nevertheless, the porosity of the current collector 520 may also render the current collector 520 penetrable to other substances including, for example, the slurries forming the electrode material 510. Accordingly, in the example shown in FIG. 5, the electrode 500 may further include a primer layer 530, which may be disposed on the current collector 520 prior to the application of the slurries forming the electrode material 510. The primer layer 530 may be configured to at least prevent a leakage of the slurries through the pores present in the current collector 520.

In some implementations of the current subject matter, the primer layer 530 may further include one or more protective components and/or materials configured to respond to an excessive voltage, pressure, and/or temperature. For example, the primer layer 530 may include a positive temperature coefficient material (e.g., polyethylene (PE) and carbon black, polyvinylidene fluoride (PVDF) and carbon black, an inorganic conductive ceramic (e.g., barium titanium oxide ($BaTiO_2$) and/or the like) and polyethylene (PE)) whose conductivity is inversely proportional to the temperature of the battery cell 100. Alternatively, the primer layer 530 may include a material that responds to an excessive voltage, pressure, and/or temperature by creating a nonconductive gap between the current collector 520 and one or more layers of the electrode material 510. For instance, the primer layer 530 may generate a gas and/or a liquid that further transitions to a gas when exposed to an excessive voltage, pressure, and/or temperature. The gas may generate the nonconductive gap by at least causing a delamination between the electrode material 510 and the current collector 520. Alternatively and/or additionally, the gas and/or the liquid may generate the nonconductive gap by at least decomposing at least a portion of the electrode material 510.

Table 1 below depicts the voltage profiles of two sample battery cells that have been subject to pre-lithiation including, for example, the overall cell voltage, the voltage of the positive electrode, and the voltage of the negative electrode. As shown in Table 1, pre-lithiating a battery cell may increase the open circuit voltage of the battery cell. As shown in Equation (1) below, the open circuit voltage of the battery cell may correspond to a difference in electrical potential between the negative terminal and the positive terminal of the battery cell when the battery cell is not connected to an external load.

$$V_{OC} = V_p - V_n \qquad (1)$$

wherein $V_{OC}$ may denote the open circuit voltage of the battery cell, $V_p$ may denote a voltage at the positive terminal of the battery cell, and $V_n$ may denote a voltage at the negative terminal of the battery cell.

The open circuit voltage ($V_{OC}$) of a typical lithium ion battery cell that has not been subject to pre-lithiation is approximately 0.3 volts with the voltage at the positive terminal ($V_p$) being 3.3. volts and the voltage at the negative terminal ($V_n$) being 3.0 volts. Contrastingly, the open circuit voltage ($V_{OC}$) of a pre-lithiated lithium ion battery cell may increase to 3.0 volts with the voltage at the negative terminal ($V_n$) being less than 3.0 volts due to the deposit of lithium ions at the negative electrode.

TABLE 1

| Sample | Cell Voltage, $V_c$ (V) | Positive Voltage*, $V_p$ (V) | Negative Voltage*, $V_n$ (V) |
|---|---|---|---|
| Sample 1 | 3.3792 | 3.4168 | 0.0376 |
| Sample 2 | 3.3858 | 3.5229 | 0.1372 |

Figure 7A:
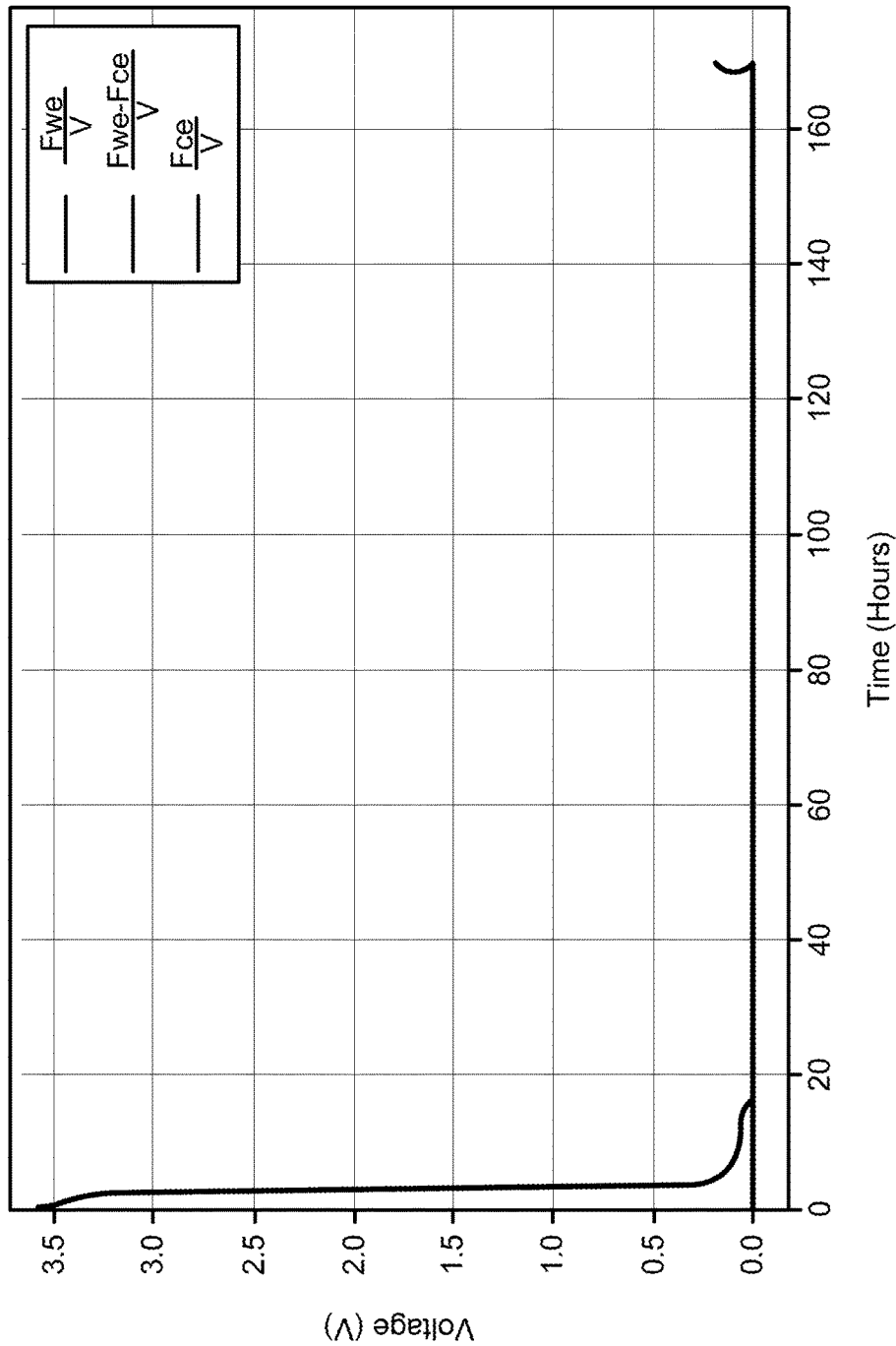
FIG. 7A depicts a graph illustrating a voltage profile associated with over discharging a battery cell having surplus lithium consistent with implementations of the current subject matter.
Figure 7B:
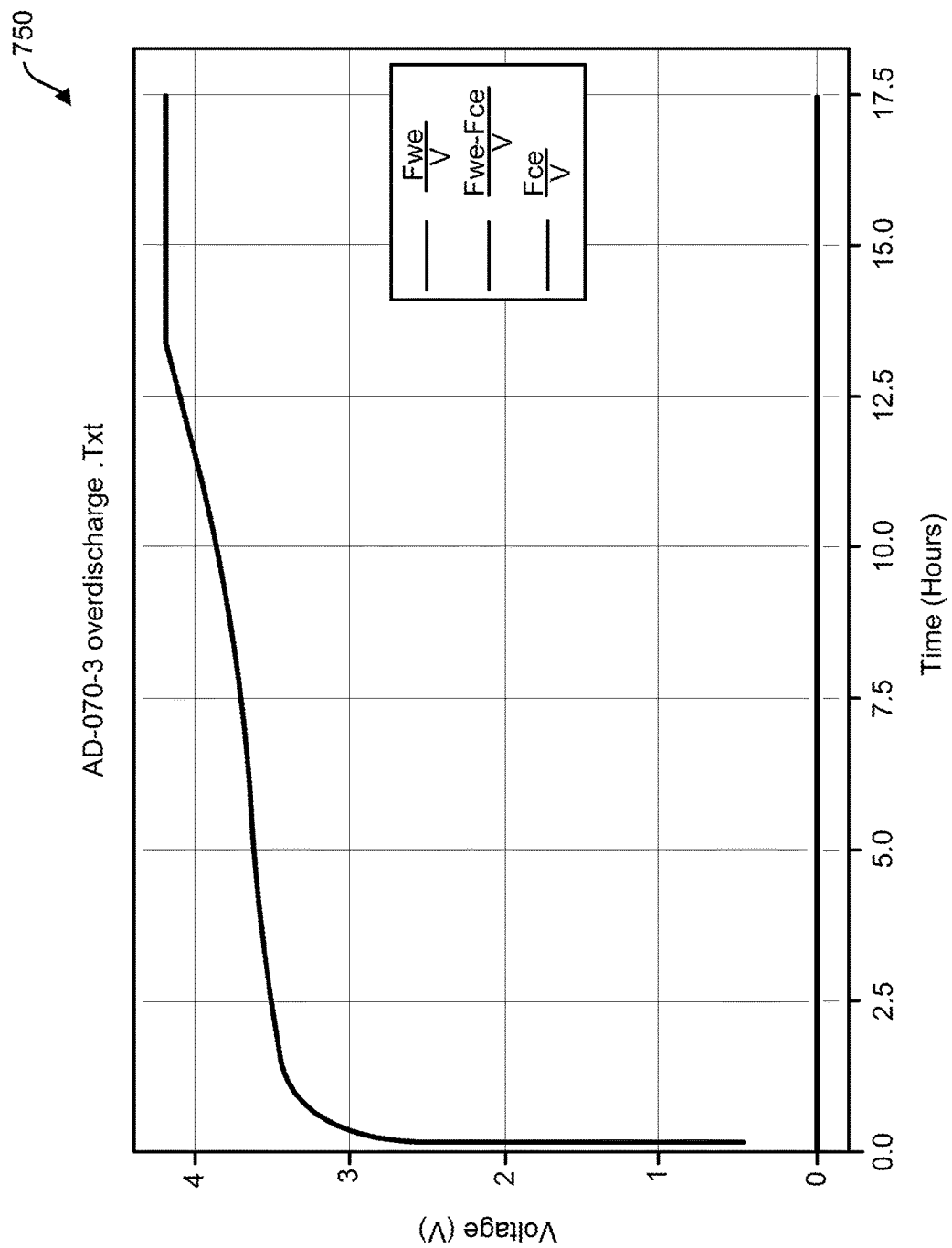
FIG. 7B depicts a graph illustrating a voltage profile associated with recharging a battery cell having surplus lithium consistent with implementations of the current subject matter.

FIG. 7A depicts a graph 700 illustrating a voltage profile associated with over discharging a battery cell having surplus lithium consistent with implementations of the current subject matter. Graph 700 shows that the battery cell may be over discharged, for example, beyond a cut off voltage. FIG. 7B depicts a graph 750 illustrating a voltage profile associated with recharging a battery cell having surplus lithium consistent with implementations of the current subject matter. As shown in FIG. 7B, the battery cell having surplus lithium may exhibit minimal capacity degradation despite being subject to being over discharged. As noted, the surplus lithium may mitigate the effects of the adverse chemical reactions triggered by the over discharging of the battery cell because the adverse chemical reactions triggered by the over discharging of the battery cell act on the surplus lithium instead of damaging the components of the battery cell.

Figure 8A:
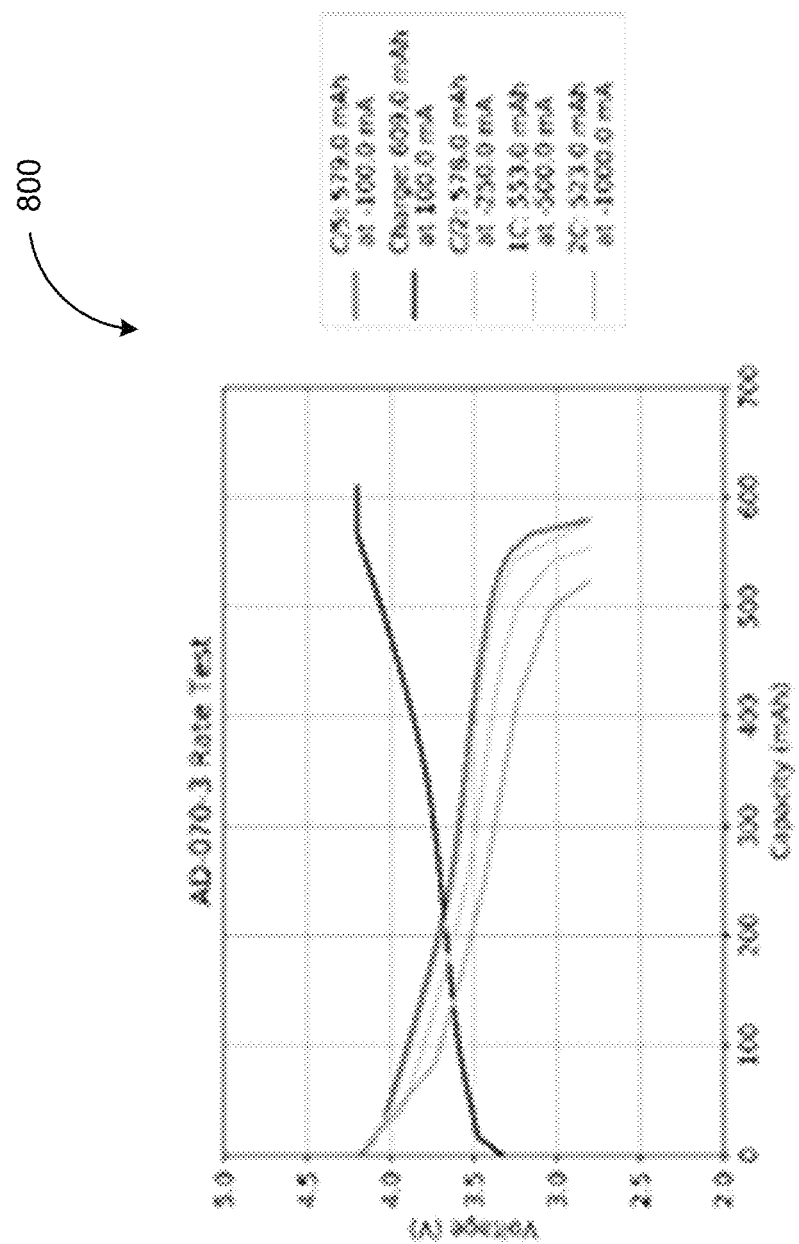
FIG. 8A depicts a graph illustrating a rate capability of a battery cell having surplus lithium consistent with implementations of the current subject matter.
Figure 8B:
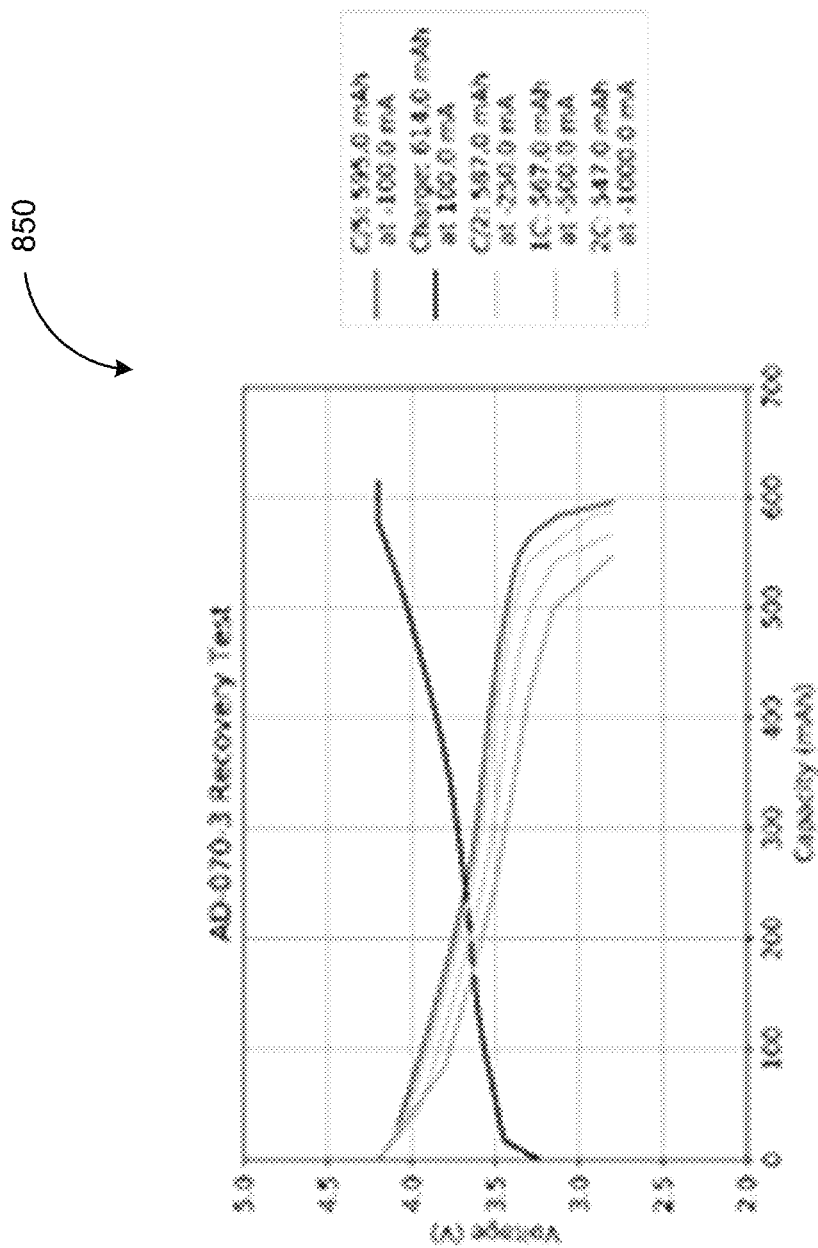
FIG. 8B depicts a graph illustrating a rate capability of a battery cell having surplus lithium consistent with implementations of the current subject matter.

FIGS. 8A-B further depict the effects of the surplus lithium in protecting the battery cell from the adverse effects of being over discharged, for example, beyond a cut off voltage. For example, FIG. 8A depicts a graph 800 illustrating a rate capability of the battery cell having surplus lithium prior to being over discharged. Meanwhile, FIG. 8B depicts a graph 850 illustrating a rate capability of the battery cell having surplus lithium subsequent to being over discharged. As shown in FIGS. 8A-B, the performance of the battery cell, as indicated by its rate capability, remains unaffected by the over discharge due to the inclusion of the surplus lithium.

Figure 9:
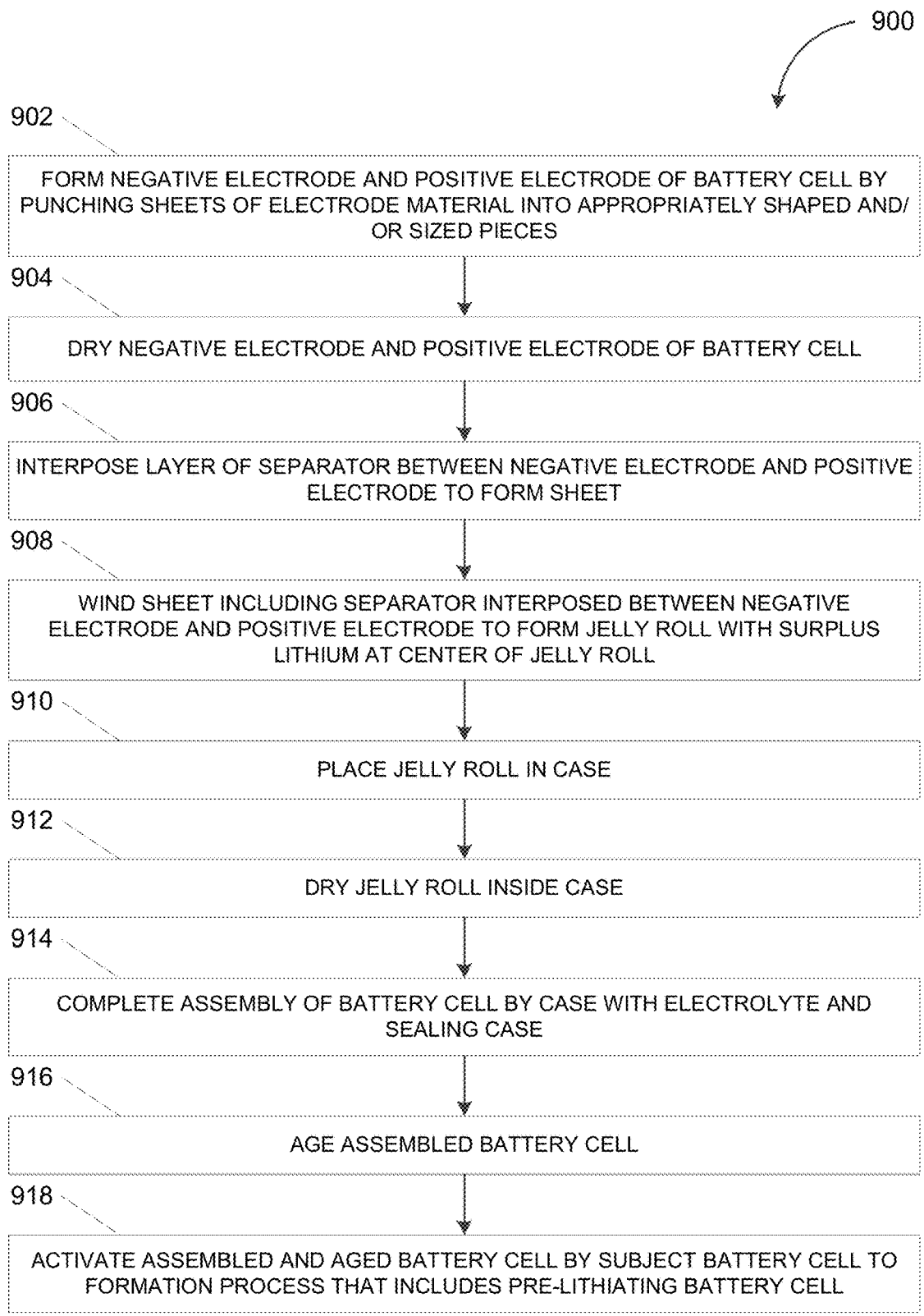
FIG. 9 depicts a flowchart illustrating a process for assembling a battery cell consistent with implementations of the current subject matter.

FIG. 9 depicts a flowchart illustrating a process 900 for assembling a battery cell consistent with implementations of the current subject matter. Referring to FIGS. 1A-B, 2A-B, 3, and 9, the process 900 can be performed to form the battery cell 100 and/or the battery cell 200.

The negative electrode and positive electrode of the battery cell may be formed by punching sheets of electrode material into appropriately shaped and/or sized pieces (902). For instance, sheets of positive electrode material and/or negative electrode material may be punched into appropriately shaped and/or sized pieces using an electrode tab. The negative electrode and the positive electrode of the battery cell may be dried (904). For example, the positive electrode of the battery cell may be dried at 125° C. for 10 hours while the negative electrode of the battery cell may be dried at 140° C. for 10 hours.

A layer of separator may be interposed between the positive electrode and the negative electrode to form a sheet (906). For instance, a layer of separate may be laminated the positive electrode and the negative electrode of the battery cell to form a sheet. The sheet including the separator interposed between the positive electrode and the negative electrode may be wound to form a jelly roll with a surplus lithium at a center of the jelly roll (908). For example, the sheet including the separator interposed between the positive electrode and the negative electrode may be wound around a mandrel. The mandrel may be removed from a center of the jelly roll before the surplus lithium is inserted into the cavity formed by the removal of the mandrel. Alternatively, the sheet including the separator, the positive electrode, and the negative electrode may be wound around the surplus lithium such that the surplus lithium is disposed at the center of the jelly roll as a result of winding the separator, positive electrode, and the negative electrode to form the jelly roll. In the example shown in FIGS. 1A-B, the jelly roll may be substantially cylindrical in shape in order to form a cylindrical battery cell. Alternatively, FIG. 2A-B show that the jelly roll may form an elliptic cylinder in order to accommodate a prismatic battery cell.

The jelly roll may be placed in a case (910). For instance, the flat jelly-roll formed in operation 908 may be placed inside a metallic (e.g., aluminum (Al)) case. The jelly-roll may be dried inside the case (912). For example, the flat jelly-roll inside the case may be dried at 70° C. for 10 hours. The case may be filled with electrolyte and sealed to complete the assembly of the battery cell (914).

The assembled battery cell may be aged (916). For instance, the battery cell formed in operation 914 can be aged for 36 hours. The assembled and aged battery cell may be activated by subjecting the battery cell to a formation process that includes pre-lithiating the battery cell (918). For example, the battery cell may undergo a formation process in which the battery cell is subject to a controlled charge and discharge cycle configured to activate the chemical components of the battery cell. This formation process may require the battery cell to be charged by being exposed to a gradually increasing current instead of a constant current such that the buildup of voltage within the battery cell is gradual.

In some implementations of the current subject matter, the battery cell including the surplus lithium may be pre-lithiated as part of the formation process in order to compensate for lithium that is lost during the formation process. For example, when the surplus lithium is connected to the positive electrode of the battery cell, the battery cell may at least partially charged first before being pre-lithiated with lithium deposits at the positive electrode of the battery cell. The battery cell may be discharged once the battery cell is pre-lithiated. Alternatively, when the surplus lithium is connected to the negative electrode of the battery cell, the battery cell may be charged and at least partially discharged before being pre-lithiated with deposits of lithium at the negative electrode of the battery cell. Once the formation process, including pre-lithiation to compensate for lithium lost during the formation process, is complete, the battery cell may be ready for grading and/or use.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery cell protected for when the battery cell is discharged beyond a cutoff voltage of about 0 volts to 1.8 volts, comprising:
    a jelly roll formed during an assembly of the battery cell by winding a separator, a positive electrode, and a negative electrode; and
    over discharge protection comprising surplus lithium disposed inside a cavity formed at a center of the jelly roll by the winding the separator, the positive electrode, and the negative electrode, the surplus lithium being electrically decoupled from the positive electrode and the negative electrode during a formation of the battery cell which includes the assembly of the battery cell and subjecting the battery cell to an initial charging followed by at least a partial discharging of the battery cell, the surplus lithium being connected to the negative electrode but not the positive electrode once the battery cell is formed to compensate for lithium lost during the formation of the battery cell, the surplus lithium further remaining connected to the negative electrode but not the positive electrode in order for the surplus lithium to be discharged during a subsequent discharge of the battery cell to lithiate the battery cell and prevent an anodic corrosion of a negative current collector of the battery cell when the battery cell is over discharged.

2. The battery cell of claim 1, wherein the surplus lithium is further connected to the negative current collector of the battery cell.

3. The battery cell of claim 1, wherein the separator, the positive electrode, and the negative electrode is wound around a mandrel to form the jelly roll, and wherein the cavity is formed by removing the mandrel from the jelly roll.

4. The battery cell of claim 1, wherein the jelly roll is formed by winding the separator, the positive electrode, and the negative electrode around the surplus lithium.

5. The battery cell of claim 1, wherein the battery cell comprises a prismatic battery cell or a cylindrical battery cell.

6. The battery cell of claim 1, wherein the battery cell includes additional surplus lithium applied to an exterior surface of the jelly roll and/or an interior surface of a case of the battery cell.

7. The battery cell of claim 1, wherein the jelly roll is further formed by winding a current collector along with the separator, the positive electrode, and the negative electrode, and wherein the current collector is porous in order to enable lithium from the surplus lithium to diffuse through the jelly roll.

8. The battery cell of claim 1, wherein the surplus lithium includes a protective layer and a lithium core, and wherein the protective layer covers at least a portion of an exterior surface of the lithium core.

9. The battery cell of claim 8, wherein the protective layer comprises a perforated metal, a polymer, and/or a ceramic.

10. A method for manufacturing a battery cell that is protected for when the battery cell is discharged beyond a cutoff voltage of about 0 volts to 1.8 volts, comprising:
    forming the battery cell by at least assembling the battery cell and subjecting the battery cell to an initial charging followed by at least a partial discharging of the battery cell, the battery cell including a jelly roll formed by winding a separator, a positive electrode, and a negative electrode, the battery cell further including over discharge protection comprising surplus lithium disposed inside a cavity formed at a center of the jelly roll by the winding the separator, the positive electrode, and the negative electrode, the surplus lithium being electrically decoupled with the negative electrode and the positive electrode during the forming of the battery cell;
    upon forming the battery cell, connecting the surplus lithium to the negative electrode but not the positive electrode in order to compensate for lithium lost during the forming of the battery cell, and the surplus lithium further remaining connected to the negative electrode but not the positive electrode in order for the surplus lithium to be discharged during a subsequent discharge of the battery cell to lithiate the battery cell and prevent an anodic corrosion of a negative current collector of the battery cell when the battery cell is over discharged; and
    lithiating the battery cell by at least discharging the surplus lithium during one or more subsequent discharging of the battery cell during which the battery cell is over discharged.

11. The method of claim 10, wherein the surplus lithium is further connected to the negative current collector of the battery cell.

12. The method of claim 10, wherein the separator, the positive electrode, and the negative electrode is wound around a mandrel to form the jelly roll, and wherein the cavity is formed by removing the mandrel from the jelly roll.

13. The method of claim 10, wherein the jelly roll is formed by winding the separator, the positive electrode, and the negative electrode around the surplus lithium.

14. The method of claim 10, wherein the battery cell comprises a prismatic battery cell or a cylindrical battery cell.

15. The method of claim 10, wherein the battery cell includes additional surplus lithium applied to an exterior surface of the jelly roll and/or an interior surface of a case of the battery cell.

16. The method of claim 10, wherein the jelly roll is further formed by winding a current collector along with the separator, the positive electrode, and the negative electrode, and wherein the current collector is porous in order to enable lithium from the surplus lithium to diffuse through the jelly roll.

17. The method of claim 10, wherein the surplus lithium includes a protective layer and a lithium core, and wherein the protective layer covers at least a portion of an exterior surface of the lithium core.

18. The method of claim 17, wherein the protective layer comprises a perforated metal, a polymer, and/or a ceramic.

\* \* \* \* \*